United States Patent [19]

Park

[11] Patent Number: 5,598,302
[45] Date of Patent: Jan. 28, 1997

[54] METHOD AND APPARATUS FOR DETECTING DIGITAL PLAYBACK SIGNALS USING PHASE EQUALIZATION AND WAVEFORM SHAPING OF PLAYBACK SIGNALS

[75] Inventor: See-hun Park, Suwon, Rep. of Korea

[73] Assignee: Samsung Electronics Co., Ltd., Kyungki-do, Rep. of Korea

[21] Appl. No.: 254,572

[22] Filed: Jun. 6, 1994

[30] Foreign Application Priority Data

Jun. 5, 1993 [KR] Rep. of Korea ............... 93-10175

[51] Int. Cl.⁶ .................................................. G11B 5/35
[52] U.S. Cl. ................................................ 360/65; 360/46
[58] Field of Search ........................... 360/46, 78.04, 360/45, 65, 39, 51, 362, 25; 375/327, 324, 235; 327/473, 309, 2.3; 369/107

[56] References Cited

U.S. PATENT DOCUMENTS

| | | | |
|---|---|---|---|
| 5,163,003 | 11/1992 | Kimura | 360/45 |
| 5,307,213 | 4/1994 | Nishiyama | 360/45 |
| 5,337,198 | 8/1994 | Nishiyama et al. | 360/65 |

*Primary Examiner*—Aristotelis Psitos
*Assistant Examiner*—Patrick Wamsley

*Attorney, Agent, or Firm*—Sughrue, Mion, Zinn, Macpeak & Seas

[57] ABSTRACT

A digital playback signal detection apparatus includes a phase equalization circuit for compensating and correcting for loss of a low frequency band and phase distortion in the playback signal, respectively, a waveform shaper for correcting the waveform generated by the phase equalization circuit, and a data detector for detecting the originally recorded data using an output signal of the waveform shaper and a phase-inverted version thereof. The output of the phase equalizer circuit is delayed into first and second delay signals using two delays. The second delay signal and the output signal of the phase equalizer are amplified and differentiated, and then the differentiated signal and first delay signal are linearly added to each other. According to one aspect of the invention, the data detector compensates for loss of low-frequency band from a signal reproduced from a magnetic recording medium via an integrator in a phase equalizer. According to another aspect of the invention, a limiter is connected to the output of the differentiator in the waveform shaper while two limiters are connected to the output of a buffer included in the data detector. Accordingly, the distortion and noise of the input signal is removed and the error rate associated with data-detection can be decreased while the data is stably detected, even if the tape has degenerated or the system is unstable. A method for particularly adapted to the signal detection apparatus is also described.

14 Claims, 5 Drawing Sheets

METHOD AND APPARATUS FOR DETECTING DIGITAL PLAYBACK SIGNALS USING PHASE EQUALIZATION AND WAVEFORM SHAPING OF PLAYBACK SIGNALS

BACKGROUND OF THE INVENTION

1. Field of the Invention

The present invention relates to a system-for reproducing a digital signal which is recorded in a predetermined recording medium, and more particularly, to a digital playback signal detecting method and apparatus thereof which can facilitate data restoration at maximum by supplementing a function of a data detection circuit which compensates for damaged and distorted playback signals, and which can detect data stably even in a signal having a low signal-to-noise ratio.

2. Discussion of Related Art

In a general digital magnetic recording and reproducing system such as a D-VCR and DAT for recording and reproducing a digital signal, an input analog signal is recorded on a recording medium such as a magnetic tape with a digital signal, and then a playback digital signal, during reproduction, is restored into a digital signal which is the same as that during recording, to thereby convert the restored digital signal into an analog signal. In this case, when restoring data of the playback signal, the error rate is increased by intersymbol interference and signal-to-noise ratio degradation primarily due to the characteristics of a rotary transformer, which is located between a magnetic head and an amplifier, and a recording medium. Accordingly, the overall performance of the system is lowered. To prevent the above defect, phase correction and amplitude correction with respect to the playback signal have been conventionally performed to then detect the data.

FIG. 1 is a block diagram showing a conventional digital playback signal detection apparatus, which includes a playback amplifier 11 for amplifying digital data playback from a recording medium via a playback head (not shown) into a signal of a predetermined magnitude. A first equalizer 12 for correcting phase of the amplified playback signal is connected to the output of playback amplifier 11. A second equalizer 13 having a structure of a transversal filter is connected to the output of the first equalizer 12. In more detail, second equalizer 13 includes a 3-tap equalizer having two delays 14 and 15, in each of which the tap is formed at a predetermined time of interval T, and an adder 16 for adding the output signals of the respective taps. Variable resistors are connected between each of the outputs of the taps and adder 16, respectively.

In FIG. 1, the digital data which has been recorded on a predetermined recording medium such as a magnetic tape is reproduced via a playback head (not shows). The playback signal is input to playback amplifier 11 and amplified into a signal of a predetermined magnitude. The amplified playback signal is input to first equalizer 12 to correct phase distortion. The phase-corrected playback signal is input to a first delay 14 and delayed by a predetermined time interval T. The phase-corrected playback signal is also adjusted by gain $K_3$ according to a resistance value of a variable resistor and the gain-adjusted signal is output for adder 16. The first delayed playback signal is input to second delay 15 and delayed by a predetermined time interval T. The first delayed playback signal is also adjusted by gain $K_2$ according to a resistance value of a variable resistor and the gain-adjusted signal is output for adder 16. The first delayed playback signal is also adjusted by gain $K_1$ according to a resistance value of a variable resistor and the gain-adjusted signal is output to adder 16. That is, the outputs of the respective taps do not suffer from the intersymbol interference by adjusting the resistance values of the variable resistors to change the respective gains. Adder 16 adds the outputs of the respective taps for which the gains are adjusted and, thus, improves asymmetry of a playback isolating waveform, peak-shift and amplitude degradation. Thereafter, the added signal is output to a data detector, to detect the originally recorded data. However, the conventional detection apparatus can perform correction of only a slight asymmetry and peak-shift as well as the amplitude correction, or can perform correction of only the slight peak-shift and amplitude as well as the asymmetry correction. However, the conventional equalizer cannot perform an ideal equalization at all the portions. Since the number of the taps in the transversal filter must be increased in an infinite number in order to perform an ideal equalization, it becomes difficult to adjust the gain of every tap. Also, in case of introduction of the automatic equalization algorithm, hardware implementation is burdensome.

On the other hand, a conventional differentiation-based 3-tap cosine equalizer is disclosed in a Japanese TV Journal volume 40, No. 6, 1986, "Differentiation-based Waveform EQ In High Density Digital Magnetic Recording." However, this circuit does not include an element for performing an integration function and a differentiation function needed to reduce the error rate. As a practical matter, if the tape is degraded, the state of the system becomes unstable, and the signal-to-noise ratio of the playback becomes extremely low, thus, exact data cannot be detected.

SUMMARY OF THE INVENTION

Therefore, to solve the above problems, it is an object of the present invention to provide a digital playback signal detection apparatus and the method thereof capable of reducing an error rate when restoring data by employing an integrator and a differentiator in an equalizer to correct characteristic degradation of the playback signal.

Another object of the present invention is to provide a digital playback signal detection apparatus and the method thereof for stably detecting data even in a low signal-to-noise ratio environment by limiting a differentially equalized signal and a playback signal, prior to detecting the data, with reference to a predetermined level, when a digital playback signal is equalized and detected.

These and other objects, features and advantages according to the present invention are provided by a digital playback signal detection apparatus for use in a digital recording and reproducing apparatus for equalizing and correcting a playback signal recovered from a recording medium to detect data. The digital playback signal detection apparatus includes;

a phase equalization circuit for compensating for and correcting loss of a low-frequency band and distorted phase of a playback signal;

a waveform shaping circuit for delaying the signal applied by the phase equalization circuit by a predetermined time interval T to generate first and second delay signals, for linearly adding the phase-equalized signal to the second delay signal to correct a high-band component of the resultant signal, and for linearly adding the high-band compensated signal to the first delay signal to output an equalized signal and a data detection circuit for detecting originally recorded data using an output signal of the waveform shaping circuit and a phase-inverted signal corresponding to the output signal.

These and other objects, features and advantages according to the present are accomplished by providing a digital playback signal detection method for use in a digital recording and reproducing apparatus for equalizing and correcting a playback signal from a recording medium to detect data. Preferably, the digital playback signal detection method includes steps for:

compensating for loss of a low-frequency band of a playback signal;

correcting phase distortion of a respective low-band-compensated playback signal;

delaying the phase-corrected playback signal by predetermined time interval, to output first and second delay signal;

linearly adding the phase-corrected playback signal to the second delay signal to output a linearly added signal;

compensating for a high-band component of the added signal by differentiating the added signal; and linearly adding the high-band compensated playback signal to the first delay signal to thereby output an equalized signal.

DETAILED DESCRIPTION OF THE PREFERRED EMBODIMENT

A preferred embodiment of the present invention will be described below in more detail with reference to the accompanying drawings.

Figure 1:
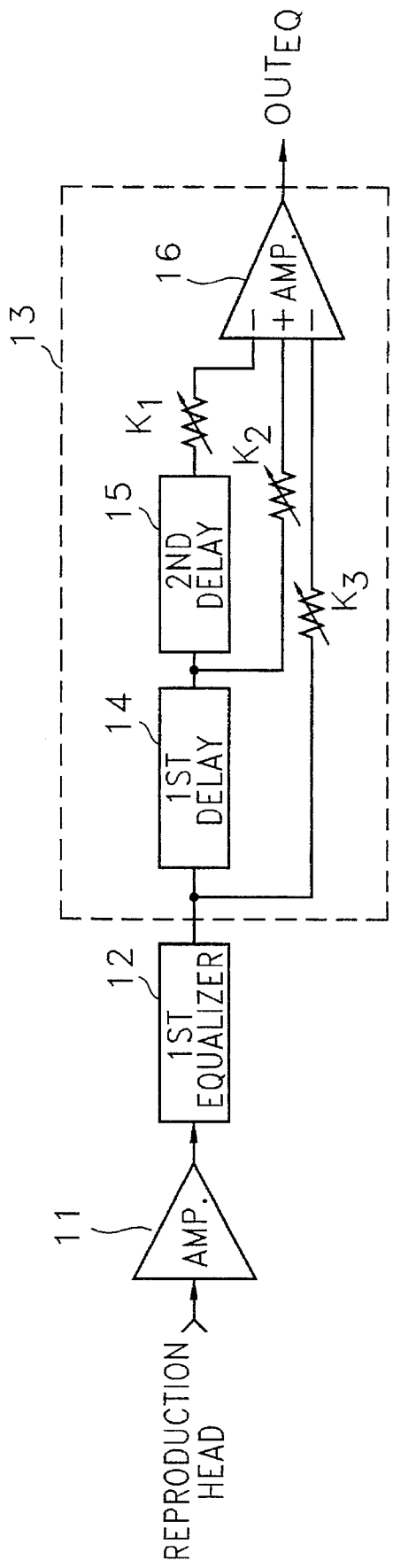
FIG. 1 is a block diagram showing a conventional digital playback signal detection apparatus.
Figure 2:
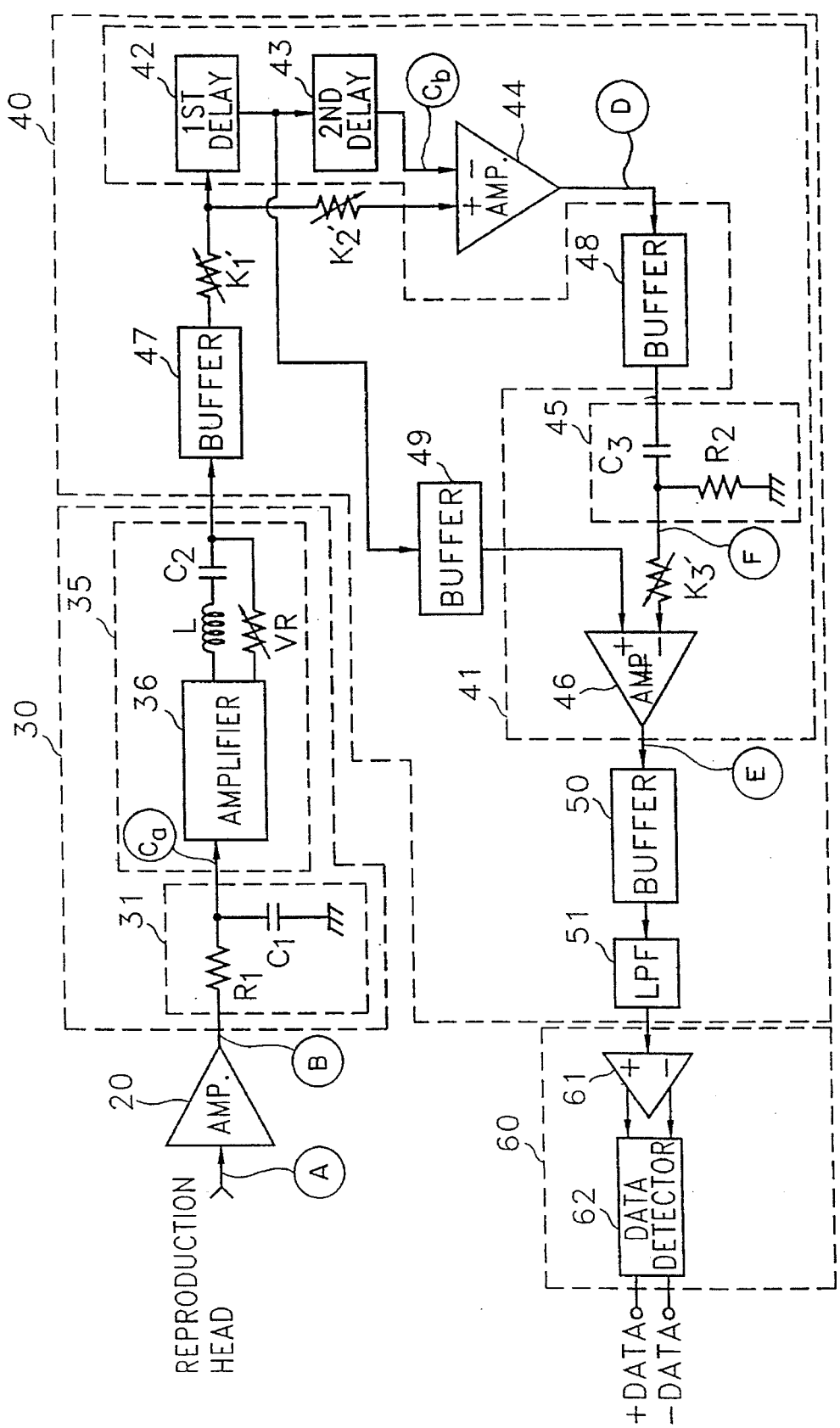
FIG. 2 is a detailed block diagram showing a digital playback signal detection apparatus according to a preferred embodiment of the present invention.

FIG. 2 is a detailed block diagram showing a digital playback signal detection apparatus according to a preferred embodiment of the present invention. The FIG. 2 apparatus includes a playback amplifier 20 for amplifying the digital data reproduced via the playback head from the recording medium into a signal of a predetermined magnitude. A phase equalizer 30 for integrating the amplified playback signal and phase-correcting the integrated signal is connected to the output of playback amplifier 20. The phase equalizer 30 includes integrator 31 for integrating the amplified playback signal and phase corrector 35, as described below, for correcting phase of the integrated playback signal.

Waveform shaper 40 which is connected to the output of phase equalizer 30 adds the output signal of phase equalizer 30 to the signal which is obtained by delaying the output signal of phase equalizer 30 using N delays, differentiates the added signal, linearly adds differentiated signals to M delayed signals, and then filters the linearly added signal, thereby correcting asymmetry, the amplitude degradation and the peak-shift, etc.

Waveform shaper 40 includes variable resistors $K_1'$ through $K_3'$, a 3-tap differential equalizer 41, a plurality of buffers 47 through 50, a low-pass filter 51 for low-pass-filtering the corrected playback signal in 3-tap differential equalizer 41.

A data detector 60, which is connected to the output of waveform shaper 40, detects an originally recorded data using a playback correction signal and phase-inverted playback correction signal responsive to waveform shaper 40.

The constitution of the digital playback signal detection apparatus shown in FIG. 2 will be described in more detail.

In integrator 31 of phase equalizer 30, a resistor $R_1$ is connected between the output of playback amplifier 20 and phase corrector 35, capacitor $C_1$ connects the output of resistor $R_1$ to ground. Phase corrector 35 includes an amplifier 36 for amplifying the integrated playback signal into a signal having a predetermined magnitude to output an in-phase signal and an inverse-phase signal, wherein a coil L and a capacitor $C_2$ are serially connected to the in-phase output of amplifier 36 while a variable resistor VR is connected to the inverse-phase output thereof.

Waveform shaper 40 includes a three-tap differential equalizer 41 having two delays 42 and 43, one of which receives the output signal of phase equalizer 30 via buffer 47 and variable resistor $K_1'$, to provide taps for a predetermined inter T, and a first differential amplifier 44 for applying a difference component between the signal input to the first delay 42 and the output signal of second delay 43. A buffer 48 buffers the output signal of a first differential amplifier 44. A differentiator 45 included in differential equalizer 41 differentiates the signal supplied through buffer 48. A buffer 49 is also connected to the output of first delay 42. A second differential amplifier 46 in differential equalizer 41 amplifies a difference component between the signal supplied via buffer 49 and the differentiated playback signal output from differentiator 45.

The operation of the digital playback signal detection apparatus constructed as described above will now be described below with reference to FIGS. 3 and 4.

Figure 3A:
FIG. 3A through FIG. 3F are waveform diagrams for explaining the operation of the FIG. 2 apparatus.
Figure 3B:
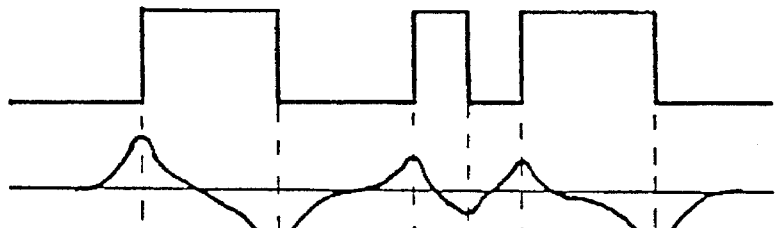
Figure 3C:
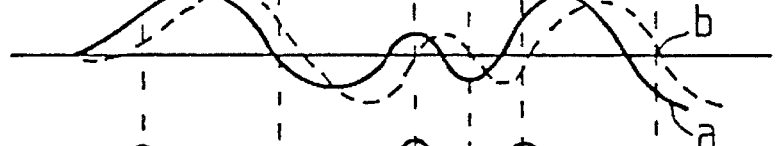
Figure 3D:
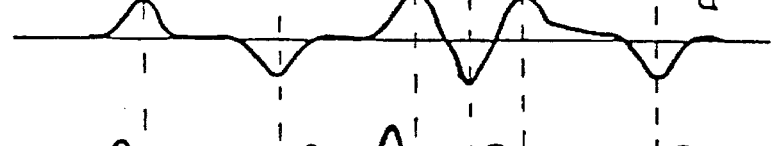
Figure 3E:
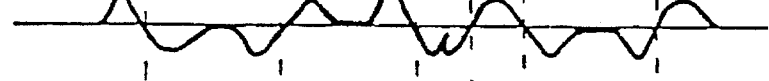
Figure 3F:
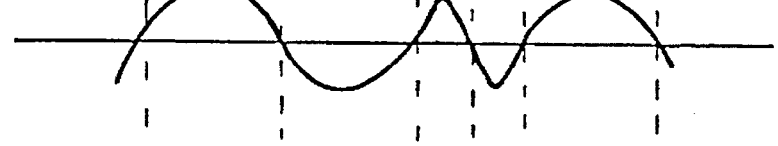

FIG. 3A through FIG. 3F are waveform diagrams for explaining the operation of the FIG. 2 apparatus. FIG. 3A is a waveform diagram of the digital data recorded on a predetermined recording medium such as a magnetic tape. FIG. 3B is a waveform diagram of the amplified signal produced via the amplifier during reproduction. Generally, the digital signal reproduced from the magnetic recording medium has a property closer to the analog signal in view of the characteristic of the recording medium. That is, as shown in FIGS. 3A and 3B, the original digital signal has a characteristic in which the amplitude is steeply changed at each inverting portion. In FIG. 3C, a curve "a" shows a waveform in which the amplified playback signal is integrated to compensate for the level of the direct-current component, and a curve "b" shows a waveform which is obtained after passing through delay 43 by a predetermined time interval 2T. FIG. 3D shows a waveform which is obtained by amplifying a difference component between the "a" and "b" waveforms shown in FIG. 3C. FIG. 3E shows a waveform which is obtained by differentiating the waveform shown in FIG. 3D, in which the portion corresponding to each inverting portion of the waveform shown in FIG. 3A is zero-forced. FIG. 3F shows a waveform which is obtained by amplifying a difference component between the waveform of FIG. 3E and the waveform delayed by a predetermined time of interval T.

In FIG. 2, the waveform (FIG. 3B) of the signal which is obtained by reproducing the digital data (FIG. 3A) recorded on the recording medium such as the magnetic tape, via the playback head, shows asymmetrical rising and falling curve slopes due to the non-linear distortion of the magnetic channel, to cause generation of the difference between the peaked amplitude magnitudes according to the runlength and of the peak-shift due to the inter-signal interference. The playback signal is amplified into a signal of a predetermined size in playback amplifier 20 (FIG. 3B).

The amplified playback signal (FIG. 3B) is input to integrator 31 in phase equalizer 30, and is integrated according to a time constant determined by resistor $R_1$ and capacitor $C_1$. The playback signal is compensated for the loss of the low-frequency band via integrator 31 so as to be close to the original signal (curve "a" in FIG. 3C). Amplifier 36 in phase corrector 35 receives the playback signal of which the loss of the low-frequency band is compensated for via the integration process (curve "a" in FIG. 3C), amplifies the received signal into a signal of a predetermined magnitude and outputs an in-phase amplified signal and an inverse-phase amplified signal, respectively. The phase distortion of the input signal is compensated for in correspondence to the frequency characteristic of the recording channel via a resonant circuit in which coil L and capacitor $C_2$ are connected in series to an in-phase amplification end of amplifier 36, and a resistance value of a value resistor VR is connected to an inverse-phase amplification end.

The playback signal with corrected phase distortion is input to a 3-tap differential equalizer 41 via buffer 47 in waveform shaper 40. That is, the playback signal input via buffer 47 is adjusted by a gain $K_1'$ according to the resistance value of the variable resistor $K_1'$ and is input to first delay 42. First delay 42 delays the input signal by a predetermined time interval T and outputs the delayed signal to second delay 43 and buffer 49, respectively. Second delay 43 delays again the signal supplied from first delay 42 by a predetermined time interval T and outputs the delayed signal to a negative input end of first differential amplifier 44.

The playback signal of which the gain is adjusted by a value $K_1'$ and outputted via an output end between buffer 47 to first delay 42, is adjusted by a gain $K_2'$ according to a resistance value of a variable resistor $K_2'$ so as to be supplied to a positive input end of first differential amplifier 44. First differential amplifier 44 linearly adds the playback signal in which the gain is adjusted by a value of $K_1' \bullet K_2'$ to the playback signal which is delayed by a predetermined time interval 2T (curve "b" in FIG. 3C) to output the added result to buffer 48 (FIG. 3D). Differentiator 45, in which capacitor $C_3$ and resistor $R_2$ are electrically connected to each other, differentiates the playback signal supplied through buffer 48 according to the time constant corresponding to $R_2 \bullet C_3$ network to narrow the pulse width of the playback signal. That is, during reproduction, the attenuated high-band component is compensated for in differentiator 45 (FIG. 3E). The differentiated playback signal is adjusted by a gain of $K_3'$ according to the resistance value of a variable resistor $K_3'$ so as to be output to the negative input terminal of second differential amplifier 46. Second differential amplifier 46 receives the playback signal which has been delayed for a predetermined time interval T and applied via buffer 49 at its positive input terminal, linearly adds the signals input via the negative and positive terminals, and outputs the added signal to buffer 50 (FIG. 3F). Low-pass filter 51 smoothes the playback signal applied via buffer 50 to remove high-band noise occurring during the differentiation and correction procedures. The signal output from low-pass filter 51 is input to a data detector 60.

A buffer 61 outputs the input playback signal, and a signal having the same shape as that of the input signal thereto but inverted in phase, to a data detector 62. Data detector 62 amplifies the difference between the two input signals at their reference level. Accordingly, the rising and falling edges of the data are produced at the respective crossing point of the two signals, to thereby output detection signals +DATA and −DATA which are thereby restored, i.e., output as a signal having the same patter as that of the original recorded data.

Figure 4:
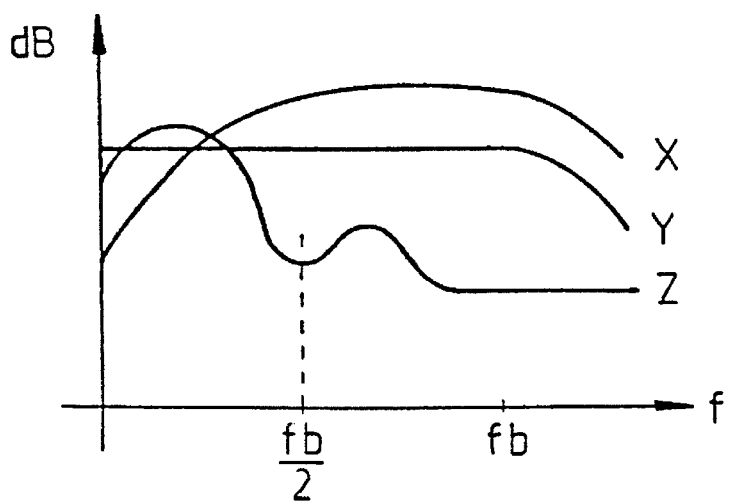
FIG. 4 shows frequency characteristic curves of the apparatus of FIG. 2.

FIG. 4 shows frequency characteristic curves in the FIG. 2 apparatus. The curve "X" of FIG. 4 shows a characteristic of the equalizer 30 itself and indicates a characteristic opposed to the channel characteristic. The curve "Y" of FIG. 4 shows a gain characteristic obtained by frequencies of the playback signal in the FIG. 2 apparatus and indicates a constant gain characteristic by frequencies. The curve "Z" of FIG. 4 shows a playback characteristic of an eight-to-fourteen modulation.

As described above, the above embodiment includes an integrator and a differentiator in the equalizer to correct for loss of the low and high-frequency bands of the playback signal due to the magnetic channel characteristic employed during reproduction. Accordingly, the asymmetry, amplitude degradation, peak-shift and degeneration in signal-to-noise ratio of the playback signal can be corrected.

However, according to the above-described embodiment, the signal picked-up from the recording medium by the head includes a great deal of noise. The signal-to-noise ratio of the playback signal is further lowered due to the high-band characteristic of the waveform shaper. Thus, distortion is created in the playback waveform corresponding to the rising and falling edges of the original recording data and the slope of the playback signal is reduced. Accordingly, time-base errors and other glitches are generated during the data detection, to thereby cause a problem whereby runlength error is produced when synchronizing with the playback clock.

For preventing the above, if a level of the playback signal is enlarged, a distorted portion of the detection point is relatively enlarged and the slope of the playback signal becomes steeper. Accordingly, a data detection error can be reduced by removing unstable distortion of the crossing portion and an unstable contact state of the crossing portion due to noise, during the data detection operation. Actually, only when a level of the playback signal during operation of the hardware is maximized, are errors produced within the error correction capability of the system. However, if the tape has degenerated so that the system state becomes unstable, the signal-to-noise ratio of the playback signal is further reduced. Accordingly, the exact data cannot be detected using the above-described embodiment.

Therefore, another embodiment of the present invention advantageously includes a circuit functioning as a means for limiting a differentially equalized playback signal and a playback signal, prior to data detection, a predetermined level, to thereby reduce an error generated due to the unstable contact state of the crossing portion and gentle slope and to prevent glitch generation. According, system performance can be improved.

Figure 5:
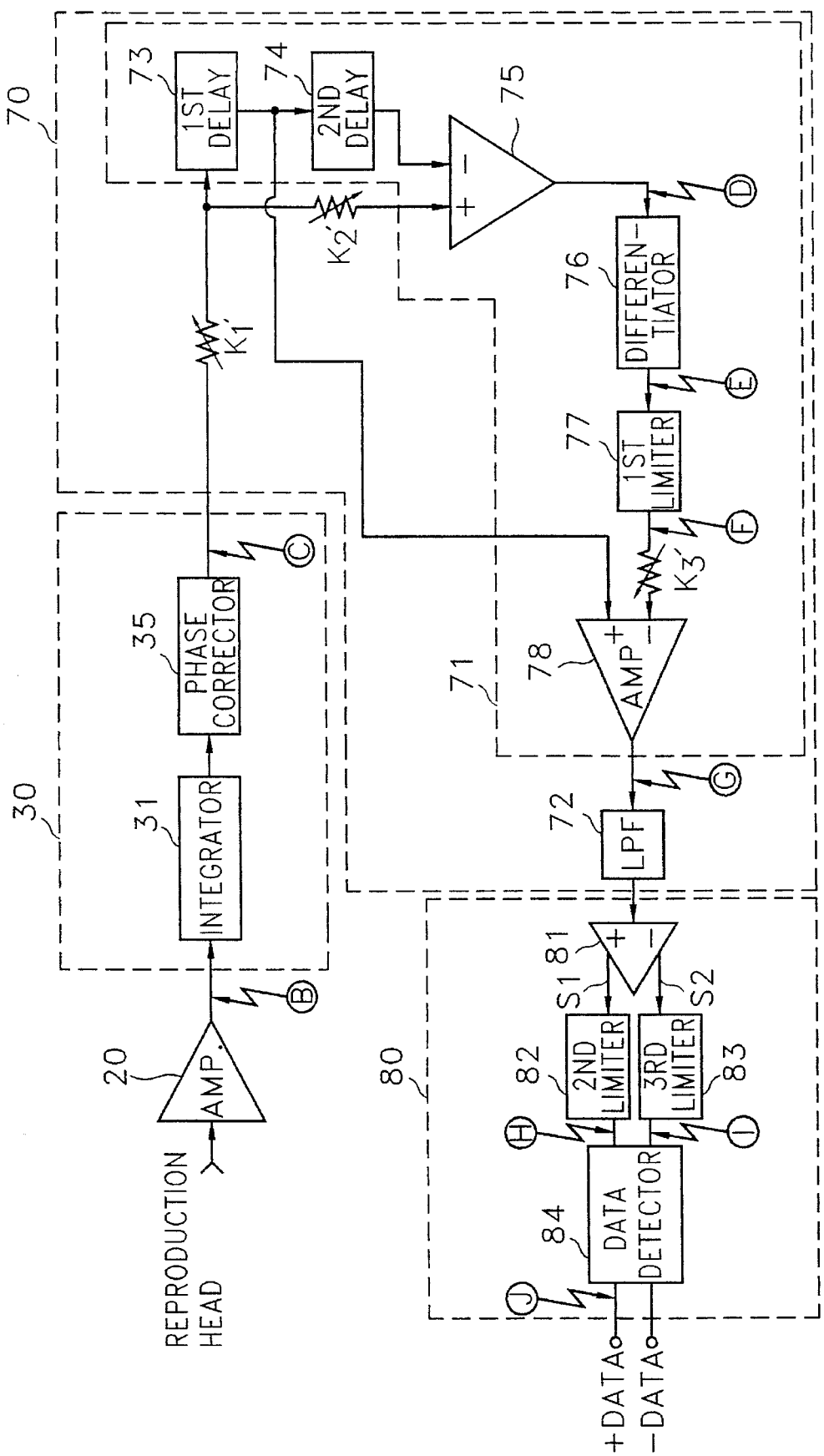
FIG. 5 is a detailed block diagram showing a digital playback signal detection apparatus according to another preferred embodiment of the present invention.

FIG. 5 is a detailed block diagram showing a digital playback signal detection apparatus according to another preferred embodiment of the present invention. In FIG. 5, constitution of a playback amplifier 20 for amplifying the signal reproduced via the head and phase equalizer 30 for integrating the amplified playback signal and phase-corrected the integrated signal are same as that of the first embodiment.

Waveform shaper 70 which is connected to the output phase equalizer adds the output signal of phase equalizer 30 to the signal which is obtained by delaying the output signal of the phase equalizer 30 using N delays, differentiates the added signal, linearly adds the differentiated signal to M delayed signal, and filters the linearly added signal, thereby correcting asymmetry, amplitude degradation and peak-shift, etc., in the playback signal. Waveform shaper 70 is substantially similar to the corresponding element of the first embodiment. A limiter 77 is additionally connected between a differentiator 76 and a variable resistor $K_3$. The differentiated signal is limited with reference to a predetermined level. Accordingly, the distortion and noise of the differentiated signal can be removed.

The playback correction signal output from waveform shaper 70 is applied to a data detector 80. Data detector 80 limits the playback signal and the phase-inverted playback signal to predetermined levels. Thereafter, an original recording data is detected using these limited signals. The construction of the data detector 80 is similar to that of the first embodiment. Two limiters 82 and 83 are advantageously connected between buffer 81 and data detector 84. Two output signals, each of which has the identical shape to that of the other and the phase-inverted relationship are limited to remove the distortion and noise of the two signals.

The operation of the digital playback signal detection apparatus constructed as described above will be described below with reference to FIG. 6.

Figure 6A:
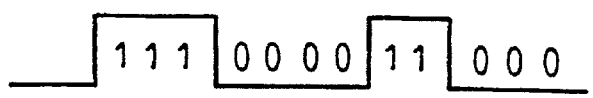
FIG. 6A through FIG. 6J are waveform diagrams for explaining the operation of the FIG. 5 apparatus.
Figure 6B:
Figure 6C:

The playback signal from the recording medium is amplified in playback amplifier 20 and then applied to integrator 31 in phase equalizer 30. Here, the signal recorded on the recording medium is a digital signal waveform as shown in FIG. 6A. The amplified playback signal is reproduced having the same shape as that shown in FIG. 6B due to the distortion, noise and interference. The playback signal is integrated in integrator 31 and passed through phase corrector 35. Accordingly, the phase distortion corresponding to the frequency characteristic of the recording channel is corrected to thereby produce the signal shown in FIG. 6C. The output signal of phase equalizer 30 is applied to waveform shaper 70 and attenuated by variable resistors $K_1'$ and $K_2'$, to then be input to first differential amplifier 75.

The delay time 2T of the two delays 73 and 74 in 3-tap differential equalizer 71 is fixed. If the gain of undelayed signal (0T signal) is "1" and an attenuation ratio of the variable resistor $K_3'$ is ½, the characteristic of the output signal (the FIG. 6G waveform) in 3-tap differential equalizer 71 is determined as a transfer function:

$H(w)=eEXT(-jwT)*(1+wK_3'K_3'SINwT)$.

Figure 6D:
Figure 6E:
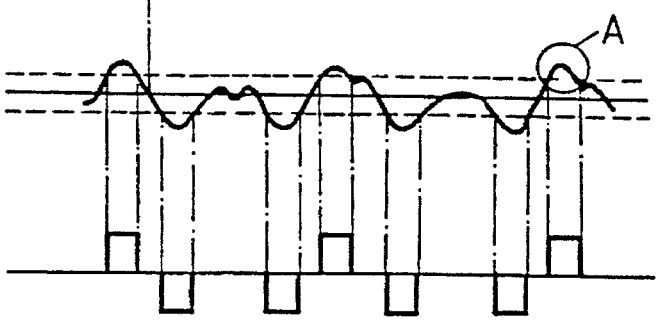
Figure 6F:

In more detail, the signal delayed by 2T and the original signal passing through the variable resistors $K_1'$ and $K_2'$ are linearly added to each other in first differential amplifier 75 to become a signal if FIG. 6D. The signal of FIG. 6D is applied to differentiator 76 and then differentiated. Accordingly, the low-band component is removed as shown in FIG. 6E. The differentiated signal is then applied to first limiter 77. First limiter 77 outputs a positive polarity signal with respect to the signal greater than an upper reference level, outputs a negative polarity signal with respect to a signal less than a lower reference level, and outputs a signal "0" in response to a signal between the upper and lower reference levels, respectively (the FIG. 6F waveform). So, the noise included in a portion of "A" in the differentiated signal (FIG. 6E) can be removed. The output signal from first limiter 77 is applied to second differential amplifier 78 through variable resistor $K_3'$ and is added to a 1T delayed signal provided by first delay 73.

Figure 6G:
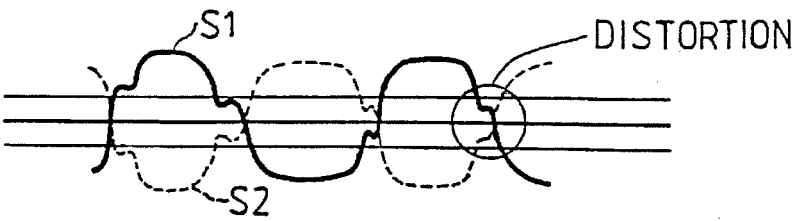
Figure 6H:
Figure 6I:
Figure 6J:
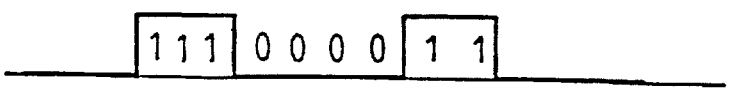

As shown in FIG. 6G, the playback signal in which the amplitude correction and waveform correction are completed passes through low-pass filter 72. Accordingly, the high-band noise created by emphasizing the high-band in advance is removed and applied to buffer 81. Buffer 81 outputs the input signal S1 represented as a solid line and a dotted line S2 having the same shape as the input signal but is a phase-inverted signal, to second and third limiters 82 and 83, respectively. Second limiter 82 receives the output signal S1 of buffer 81, and outputs a positive polarity signal with respect to a signal greater than the upper reference level and "0" with respect to a signal less than the upper reference level, respectively, as shown in FIG. 6H. Third limiter 83 receives the output signal S2 of buffer 81, and outputs a negative polarity signal with respect to a signal less than the lower-reference level and "0" with respect to a signal greater than the lower reference level, respectively, as shown in FIG. 6I. Thus, the distortion and noise includes in the output signal of buffer 81 are removed and the output signals of two limiters 82 and 83 are applied to data detector 84. Data detector 84 makes the rising and falling edges of the data the crossing points, i.e., when the two input signals cross each other, centering a single reference level. Accordingly, the detection signals +DATA and −DATA are exactly restored, i.e., have the same shape as that of the original recording data, as shown in FIG. 6J.

In the described preferred embodiments of the present invention, the invention is described only with respect to the case of using two delays and one differentiator. However, the present invention is not limited thereto. It will be apparent to a person skilled in the art that the present invention can be extended to accommodate the use of using N delays and M differentiators (herein, M and N are integers with M<N), while accordingly omitting the detailed descriptions thereof.

As described above, the present invention includes an integration circuit and a differentiation circuit in the equalizer used during reproduction to correct loss of the low-band and high-band frequencies from the playback signal due to the magnetic channel characteristic, Accordingly, the asymmetry of the playback waveform is improved by more than one-half times while the amplitude degradation experiences peak-shift amounting to a 15% increase, and signal-to-noise ratio can be corrected. Particularly, when viewing eye pattern, an opening aperture of more than 60% can be obtained to thereby obtain a very advantageous detection window width in case of data-detection. Accordingly, error rate can be remarkably lowered.

Advantageously, since the differentially equalized signal and the playback signal prior to the data detection is limited to a predetermined level, even though the tape may have degenerated, and the system becomes unstable, the whole signal-to-noise ratio can still be lowered, allowing the data to be detected stably to thereby improve the overall performance of the system.

What is claimed is:

1. A digital playback signal detection apparatus for use in a digital recording and reproducing apparatus for equalizing and correcting a playback signal from a recording medium to thereby detect recorded data, said digital playback signal detection apparatus comprising:

phase equalization means for compensating for and correcting loss of a low frequency band and distorted phase of said playback signal so as to generate a phase-equalized signal;

waveform shaping means for delaying said phase-equalized signal by a predetermined time interval to thereby generate first and second delay signals, for linearly adding said phase-equalized signal to the second delay signal to thereby produce a high-band compensated signal, and for linearly adding said high-band compensated signal to the first delay signal to thereby output a waveform compensated signal; and data detection means for detecting the originally recorded data using said waveform compensated signal and a corresponding phase-inverted signal.

2. The digital playback signal detection apparatus according to a claim 1, wherein said waveform shaping means further comprises a differentiator for differentiating an added signal produced by addition of said second delay signal and said phase-equalized signal to thereby produce said high-band compensated signal.

3. The digital playback signal detection apparatus according to claim 2, further comprising a low-pass filter for low-pass-filtering said added signal so as to generate said waveform compensated signal.

4. The digital playback signal detection apparatus according to claim 3, wherein said waveform shaping means further comprises a limiter for limiting the differentiated high-band compensated signal to a predetermined reference level and for removing distortion and noise of the differentiated high-band compensated signal, and which is connected to an output of said differentiator.

5. The digital playback signal detection apparatus according to claim 2, wherein said waveform shaping means further comprises:

a limiter operatively connected to receive an output from said differentiator for limiting the differentiated high-band compensated signal to a predetermined reference level and removing distortion and noise of said high-band compensated signal.

6. The digital playback signal detection apparatus according to claim 5, wherein said limiter receives the differentiated high-band compensated signal, and outputs a positive polarity signal with respect to a signal greater than an upper reference level, a negative polarity signal with respect to a signal less than a lower reference level and a zero signal with respect to a signal between said upper and said lower reference levels.

7. The digital playback signal detection apparatus according to claim 1, wherein said data detection means comprises first and second limiters for limiting said waveform compensated signal and the phase-inverted signal thereof to first and second respective predetermined reference levels and removing the distortion and noises of said two signals, respectively.

8. The digital playback signal detection apparatus according to claim 7, wherein said first limiter receives said waveform compensated signal, and outputs a positive polarity signal with respect to a signal greater than said first reference level and a zero signal with respect to a signal less than the first reference level.

9. The digital playback signal detection apparatus according to claim 7, wherein said second limiter receives an inverted waveform compensated signal, and outputs a negative polarity signal with respect to a signal less than said second reference level and a zero signal with respect to a signal more than the said reference level.

10. The digital playback signal detection apparatus according to claim 1, wherein said waveform shaping means comprises:

delaying means for generating first and second delay signals responsive to said playback signal;

first means for receiving and for combining said second delay signal with said phase-equalized signal; and second means for receiving and for combining said first delay signal and a respective output of said first means to thereby generate said waveform compensated signal.

11. A digital playback signal detection apparatus according to claim 10, wherein said first means comprises an adder and a differentiator.

12. A digital playback signal detection apparatus for use in a digital recording and reproducing apparatus for equalizing and correcting a playback signal for a recording medium to thereby detect recorded data, said digital playback signal detection apparatus comprising:

phase equalization means for compensating for and correcting loss of a low frequency band and distorted phase of said playback signal so as to generate a phase-equalized signal;

waveform shaping means for delaying said phase-equalized signal by a predetermined time interval to thereby generate first and second delay signals, for linearly adding said phase-equalized signal to the second delay signal to thereby produce a high-band compensated signal, and for linearly adding said high-band compensated signal to the first delay signal to thereby output a waveform compensated signal; and data detection means for detecting the originally recorded data using said waveform compensated signal and a corresponding phase-inverted signal;

wherein said phase equalization means further comprises:
an integrator for integrating said playback signal to produce an integrated playback signal; and
an amplifier for amplifying said integrated playback signal into a signal of a predetermined size to thereby output an in-phase signal and an inverse-phase signal, respectively,
wherein a coil and a capacitor are connected in series to an output end of the in-phase amplified signal in said amplifier, and a variable resistor is connected so as to receive a respective inverse-phase amplified signal thereof.

13. A digital playback signal detection method for use in a digital recording and reproducing apparatus for equalizing and correcting a playback signal from a recording medium to detect recorded data, said digital playback signal detection method comprising the steps of:

compensating for loss of a low frequency band of said playback signal to produce a low-band-compensated play back signal;

correcting phase distortion in said low-band-compensated playback signal to thereby provide a phase-corrected playback signal;

delaying said phase-corrected playback signal by a predetermined time interval to thereby output first and second delay signals;

linearly adding said phase-corrected playback signal to said second delay signal so as to output a linearly added signal;

further compensating for a high band component of said added signal by differentiating said added signal to thereby provide a high-band compensated playback signal; and linearly adding said high-band-compensated playback signal to said first delay signal to output an waveform compensated signal.

14. The digital playback signal detection method according to claim 13, further comprising the step of low-pass-filtering said waveform compensated signal.

* * * * *